United States Patent
Tobe et al.

(10) Patent No.: US 11,572,604 B2
(45) Date of Patent: Feb. 7, 2023

(54) ROLLER SCRAPER

(71) Applicant: JFE Steel Corporation, Tokyo (JP)

(72) Inventors: Teruhiko Tobe, Tokyo (JP); Takashi Doi, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 414 days.

(21) Appl. No.: 16/634,999

(22) PCT Filed: Jul. 25, 2018

(86) PCT No.: PCT/JP2018/027996
§ 371 (c)(1),
(2) Date: Jan. 29, 2020

(87) PCT Pub. No.: WO2019/026740
PCT Pub. Date: Feb. 7, 2019

(65) Prior Publication Data
US 2020/0157652 A1 May 21, 2020

(30) Foreign Application Priority Data

Aug. 4, 2017 (JP) .............................. JP2017-151273

(51) Int. Cl.
*C21D 9/56* (2006.01)
*B08B 1/00* (2006.01)
(Continued)

(52) U.S. Cl.
CPC .............. *C21D 9/563* (2013.01); *B08B 1/005* (2013.01); *B65G 45/12* (2013.01); *B65G 45/14* (2013.01); *B65G 45/16* (2013.01)

(58) Field of Classification Search
CPC .......... C21D 9/563; C21D 9/56; B08B 1/005; B65G 45/14; B65G 45/12; B65G 45/16
(Continued)

(56) References Cited

U.S. PATENT DOCUMENTS 423,069 A * 3/1890 Miller .................... B65G 45/12
198/497
4,696,388 A * 9/1987 Stoll .................... B65G 45/12
198/497
(Continued)

FOREIGN PATENT DOCUMENTS

CN 1205970 A 1/1999
CN 102234714 A 11/2011
(Continued)

OTHER PUBLICATIONS

International Search Report and Written Opinion for International Application No. PCT/JP2018/027996, dated Oct. 23, 2018, 5 pages.
(Continued)

*Primary Examiner* — James R Bidwell
(74) *Attorney, Agent, or Firm* — RatnerPrestia

(57) ABSTRACT

To provide a roller scraper capable of having a long service life. A roller scraper that removes attached substances on a surface of a roller, the roller scraper including a scraper main body that is supported on a floor portion and a scraping claw that is disposed in such a manner as to project in a width direction of the scraper main body. The scraping claw is placed against the roller in such a manner as to be in contact with the surface of the roller, and an opening is formed in the scraper main body.

2 Claims, 4 Drawing Sheets

(51) Int. Cl.
   *B65G 45/14* (2006.01)
   *B65G 45/12* (2006.01)
   *B65G 45/16* (2006.01)

(58) Field of Classification Search
   USPC .......................................................... 198/497
   See application file for complete search history.

(56) References Cited

U.S. PATENT DOCUMENTS

| | | | |
|---|---|---|---|
| 5,647,476 A * | 7/1997 | Veenhof | B65G 45/12 |
| | | | 198/497 |
| 5,975,281 A | 11/1999 | Yoshizako et al. | |
| 7,950,519 B2 * | 5/2011 | DeVries | B65G 45/12 |
| | | | 198/497 |
| 2003/0116405 A1 * | 6/2003 | Stoll | B65G 45/12 |
| | | | 198/497 |
| 2012/0241288 A1 * | 9/2012 | Swinderman | B65G 45/12 |
| | | | 198/497 |
| 2012/0247922 A1 | 10/2012 | Waters | |
| 2016/0376108 A1 | 12/2016 | Ma | |

FOREIGN PATENT DOCUMENTS

| | | | |
|---|---|---|---|
| DE | 19508090 A1 | 9/1996 | |
| JP | 0873066 A | 3/1996 | |
| JP | 08188821 A | 7/1996 | |
| JP | 10329929 A | 12/1998 | |
| JP | 11286320 A | 10/1999 | |
| JP | 2011083860 A | 4/2011 | |
| KR | 10-2389000 * | 4/2022 | ............. B65G 45/16 |
| WO | 02096782 A2 | 12/2002 | |
| WO | 03074393 A | 9/2003 | |
| WO | 2009135162 A1 | 11/2009 | |

OTHER PUBLICATIONS

Chinese Office Action with Search Report for Chinese Application No. 201880050314.9, dated Nov. 4, 2020, 9 pages.

Russian Office Action with Search Report for Russian Application No. 2020103557/11, dated May 12, 2020, 7 pages.

European Communication pursuant to Article 94(3) for European Application No. 18842246.3, dated Mar. 22, 2022, 5 pages.

Japanese Office Action for Japanese Application No. 2018-557951, dated Jan. 21, 2020, with Concise Statement of Relevance of Office Action, 5 pages.

Korean Office Action for Korean Application No. 10-2020-70031 63, dated Dec. 21, 2020, with Concise Statement of Relevance of Office Action, 4 pages.

Extended European Search Report for European Application No. 18842246.3, dated Apr. 24, 2020, 9 pages.

* cited by examiner (a)

(b)

ROLLER SCRAPER

CROSS REFERENCE TO RELATED APPLICATIONS

This is the U.S. National Phase application of PCT/JP2018/027996, filed Jul. 25, 2018, which claims priority to Japanese Patent Application No. 2017-151273, filed Aug. 4, 2017, the disclosures of these applications being incorporated herein by reference in their entireties for all purposes.

FIELD OF THE INVENTION

The present invention relates to a scraper that is attached to a roller used in a high-temperature environment, such as a hearth roller in a continuous heat-treatment furnace, and that scrapes off attached substances on the surface of the roller.

BACKGROUND OF THE INVENTION

In a high-temperature continuous heat-treatment furnace that includes an in-furnace hearth roller provided for the purpose of passing steel sheets, such as, for example, a continuous siliconizing furnace that is used for manufacturing high silicon steel strips, there is a problem in that, as a result of the bottom surface of a steel strip and the hearth roller coming into contact with each other, oxide scales of the steel strip are attached and accumulated onto a surface of the hearth roller, or refractories in the furnace that falls off or scatters, products in the furnace, and the like are attached and accumulated onto the surface of the hearth roller, and these accumulated substances cause formation of pressing flaws in the steel strip that is heated to a high temperature.

Accordingly, it may be considered to attach a scraper to the hearth roller, the scraper being configured to scrape off such attached substances from the surface of the roller. However, the temperature in a furnace, such as a continuous siliconizing furnace, is very high, and thus, it is extremely difficult to install mechanical means that presses the scraper against the surface of the roller in the furnace in terms of heat resistance and durability.

To address such a problem, Patent Literature 1 discloses a scraper that includes a scraper main body provided with a scraping claw, which comes into contact with a surface of a roller, and that scrapes off attached substances on the surface of the roller along with rotation of the roller.

PATENT LITERATURE

PTL 1: Japanese Unexamined Patent Application Publication No. 8-188821

SUMMARY OF THE INVENTION

However, in the case of a scraper such as that described in Patent Literature 1, when a load that is larger than necessary to scrape attached substances off is applied between the scraper and a roller, there is a problem in that the scraping claw of the scraper becomes worn, and the service life of the scraping claw is reduced. The reduction in the service life of the scraping claw of the scraper shortens the maintenance cycle and leads to a significant reduction in the production efficiency as a result of opening a heat-treatment furnace. In addition, as a result of the scraper main body provided with the scraping claw that has been worn out and the roller coming into direct contact with each other, the surface of the roller becomes damaged, and this leads to reduction in the service life of the roller.

Means for improving wear resistance by changing the material of the scraper described in Patent Literature 1 may also be considered. However, the materials that are capable of withstanding a corrosive atmosphere due to $SiCl_4$ used in a siliconizing process and a high-temperature condition in a continuous siliconizing furnace are limited, and when considering the costs, it is difficult to change the material of the scraper.

Aspects of the present invention have been made in view of the above-described situations, and it is an object according to aspects of the present invention to provide a roller scraper capable of having a long service life.

As a result of extensive studies conducted by the inventors of the present invention, it was discovered that the service life of a scraper can be extended by forming an opening in a body portion of a scraper main body so as to reduce the weight of the scraper and by setting the load that is applied between a roller and the scraper to the minimum load that is necessary to scrape attached substances off.

Aspects of the present invention has been made on the basis of such knowledge, and are as follows.

[1] A roller scraper that removes attached substances on a surface of a roller, the roller scraper including a scraper main body that is supported on a floor portion and a scraping claw that is disposed in such a manner as to project in a width direction of the scraper main body. The scraping claw is placed against the roller in such a manner as to be in contact with the surface of the roller, and an opening is formed in the scraper main body.

[2] The roller scraper described in [1] in which the opening is provided such that a percentage of the opening in the scraper main body to 19% to 40%.

[3] The roller scraper described in [1] or [2] in which an angle θ of the scraper main body with respect to a vertical direction is 15 degrees to 40 degrees.

According to aspects of the present invention, a scraper that scrapes off attached substances on a roller can have a long service life. Therefore, the maintenance cycle can be extended, and the production efficiency can be improved.

DETAILED DESCRIPTION OF EMBODIMENTS OF THE INVENTION

Figure 1:
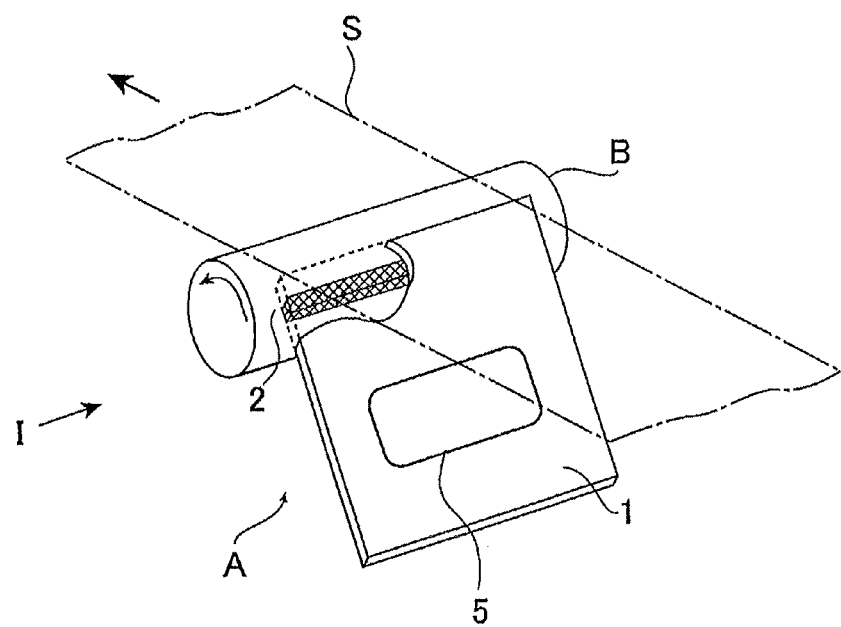
FIG. 1 is a schematic diagram illustrating a roller scraper according to an embodiment of the present invention.

FIG. 1 is a schematic diagram illustrating a roller scraper according to an embodiment of the present invention. The reference signs A, B, and S respectively denote the scraper according to aspects of the present invention, a hearth roller, and a steel strip that runs (the direction in which the steel strip S runs is indicated by an arrow). The scraper A includes a plate-shaped scraper main body 1 that is supported on a floor portion and a scraping claw 2 that is disposed on a surface of the scraper main body 1 in such a manner as to project from an upper end of the surface.

The scraping claw 2 is provided in such a manner as to project in the form of a ridge extending in the width direction of an upper portion of the scraper main body 1. Note that it is preferable that the material of the scraping claw 2 have a hardness less than the hardness of a surface of a roller that is brought into contact with the scraping claw 2 in order not to form flaws in the surface of the roller.

Figure 2:
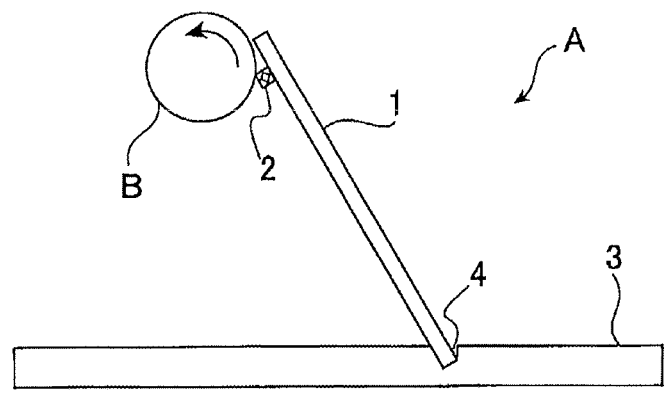
FIG. 2 is a schematic diagram of the roller scraper illustrated in FIG. 1 when viewed in the direction of arrow I of FIG. 1.

FIG. 2 is a schematic diagram of the roller scraper according to aspects of the present invention illustrated in FIG. 1 when viewed in the direction of arrow I of FIG. 1 (the lateral direction). A groove 4 is formed in the floor portion 3, and the scraper A is placed against the hearth roller B in a state where the lower end of the scraper main body 1 is inserted in the groove 4. According to such a structure, the scraper A that is placed against the hearth roller B, which rotates, is stably supported on the floor portion 3, and displacement or falling of the scraper A which becomes a factor that causes uneven pressing of the scraping claw 2 against the surface of the roller may be prevented from occurring.

The scraping claw 2 is placed against the hearth roller B in such a manner as to be in contact with the surface of the hearth roller B. Therefore, the scraping claw 2, which is in contact with the surface of the roller, scrapes off attached substances on the surface of the roller along with rotation of the roller, and as a result, the attached substances on the surface of the roller are removed.

Note that, as illustrated in FIG. 1 and FIG. 2, the above-described scraper A is in an inclined position and is placed against the hearth roller B on a rear surface side in a rotation direction of the roller in such a manner that the scraping claw 2 is in contact with the surface of the roller. The reasons why the scraper A is disposed on the rear surface side in the rotation direction of the roller are that the scraper A becomes more stable in this arrangement due to the relationship with the rotation direction of the roller and that the attached substances, which have been scraped off, does not accumulate, between the scraping claw 2 and the hearth roller B.

In accordance with aspects of the present invention, as illustrated in FIG. 1, an opening 5 is formed in the scraper main body 1. The scraper main body 1 can be reduced in weight by forming the opening 5. In addition, adjustment of the load that is applied between the scraper A and the hearth roller B can be easily performed by suitably changing the size of the opening. Therefore, the load that is applied between the scraper A and the hearth roller B can be set to the minimum load that is necessary to scrape attached substances off, and the service life of the scraper A can be extended.

FIGS. 3(a) and 3(b) illustrate examples of the opening 5 formed in the scraper main body 1. The shape of the opening 5 is not particularly limited, and a plurality of openings or one opening may be formed. In accordance with aspects of the present invention, it is preferable to set the percentage of the opening 5 in the scraper main body to 19% to 40%. In the case where this percentage is less than 19%, the load that is applied to the scraper A is large, so that a load that is larger than necessary to scrape attached substances off is applied between the scraper A and the hearth roller B, and thus, extension of the service life of the scraper A cannot be expected. In contrast, in the case where the percentage is greater than 40%, the load that is applied to the scraper A is small, and thus, attached substances cannot be sufficiently scraped off.

Note that, in accordance with aspects of the present invention, the scraper main body 1 needs to have a certain plate thickness to have strength. In accordance with aspects of the present invention, it is preferable that the plate thickness be 20 mm to 30 mm. In the case where the plate thickness is less than 20 mm, there is a possibility of breakage of the main body due to insufficient strength. In contrast, in the case where the plate thickness is greater than 30 mm, there is a possibility that an increase in the weight of the scraper main body 1 will shorten the service life of the scraping claw 2. In addition, in this case, it is difficult to install the scraper in a narrow space, and there are problems in that it is difficult to perform an installation work and in that the costs increase.

Figure 4:
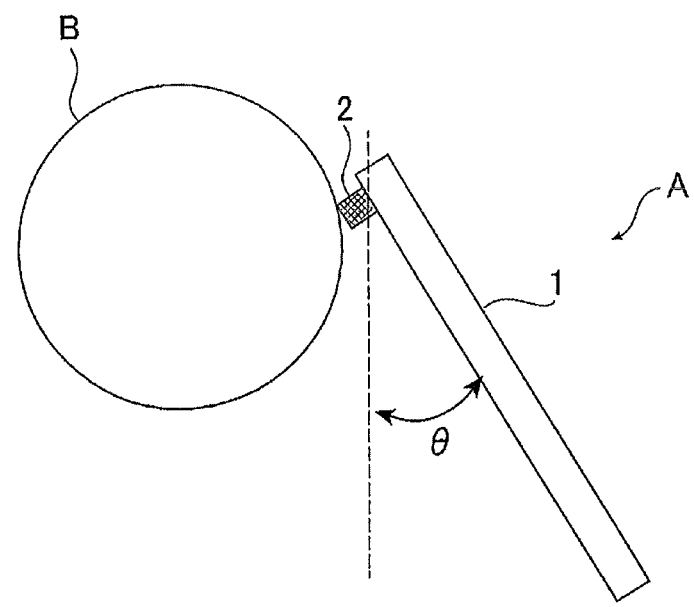
FIG. 4 is a schematic diagram illustrating an inclination angle of the scraper main body.

In accordance with aspects of the present invention, it is preferable that an inclination angle θ of the scraper main body 1 be 15 degrees to 40 degrees. The term "inclination angle θ" refers to the angle of the scraper main body 1 with respect to the vertical direction (see FIG. 4). In the case where the inclination angle θ is less than 15 degrees, the load that is applied to the hearth roller B is small, and attached substances cannot be sufficiently scraped off. In the case where the inclination angle θ is greater than 40 degrees, the load that is applied to the hearth roller B is large, and extension of the service life of the scraper A cannot be expected. In addition, in accordance with aspects of the present invention, the inclination angle of the scraper main body 1 can be changed depending on the structure of the installation location of the scraper A, and an example of the structure of the installation location is a narrow space. The percentage of the opening can be suitably controlled in accordance with the inclination angle. For example, when the load is small because the inclination angle is small, the percentage of the opening is reduced, and when the load is large because the inclination angle is large, the percentage of the opening is increased. Therefore, an optimum scraper can be designed in accordance with an installation location.

In addition, in accordance with aspects of the present invention, it is preferable that the load that is applied to the hearth roller B be 23 N to 30 N and that a contact pressure be 2 kPa to 3 kPa from the standpoint of an effect of scraping attached substances off and the standpoint of reducing the amount of wear of the scraping claw 2.

In the manner described above, according to aspects of the present invention, the service life of a scraper can be extended by forming an opening in a scraper main body so as to reduce the weight of the scraper. In addition, adjustment of the load that is applied between the scraper and a hearth roller can be easily performed by suitably changing the size of the opening.

Embodiment 1

Figure 5:
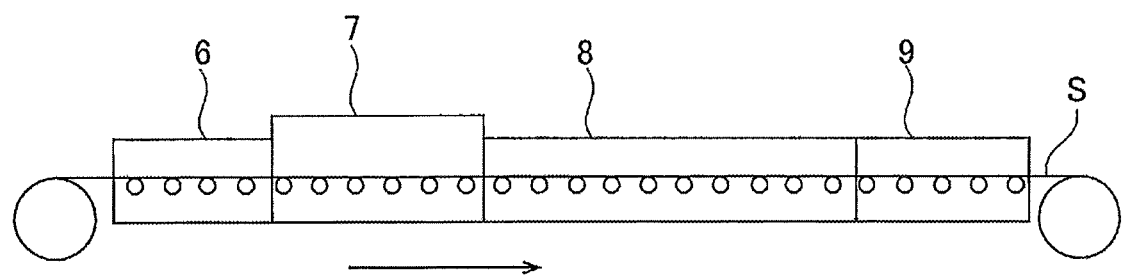
FIG. 5 is a schematic diagram illustrating a continuous siliconizing line.

In a continuous siliconizing furnace, such as that illustrated in FIG. 5, that includes a heating section 6, a siliconizing section 7, a diffusion soaking section 8 and a cooling section 9 arranged in this order from an entry side, when a high silicon steel strip is manufactured (the arrow in FIG. 5 indicates the direction in which the steel strip S runs), there is a problem in that $SiCl_4$ that is supplied to the siliconizing section 7 reacts with trace amount of oxygen and moisture in a furnace atmosphere, so that silica ($SiO_2$)

is generated, and this $SiO_2$ is attached and accumulated onto in-furnace hearth rollers in the siliconizing section and the subsequent sections, which in turn results in formation of pressing flaws in the high silicon steel strip. Accordingly, the wearing state of the scraping claw 2 in the case where the in-furnace hearth rollers in the siliconizing section 7 and the subsequent sections were each provided with the scraper according to aspects of the present invention and the wearing state of the scraping claw 2 in the case where the in-furnace hearth rollers in the siliconizing section 7 and the subsequent sections were each provided with the scraper described in Patent Literature 1 (a scraper of the related art) were examined. More specifically, the length of the scraping claw 2 in an initial state (blade length) was set to 30 mm, and the blade length after a certain period of use was measured.

Figure 3:
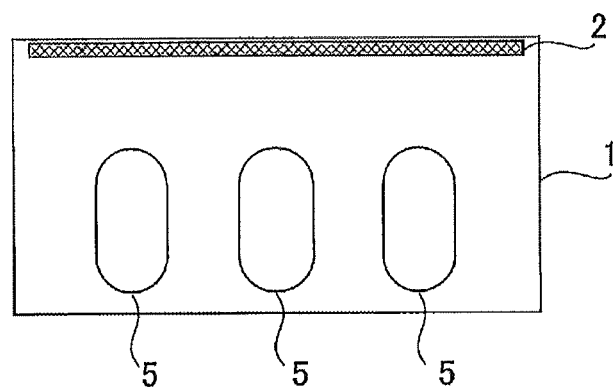
FIGS. 3(a) and 3(b) are schematic diagrams illustrating examples of the shape of an opening formed in a scraper main body.
Figure 3:
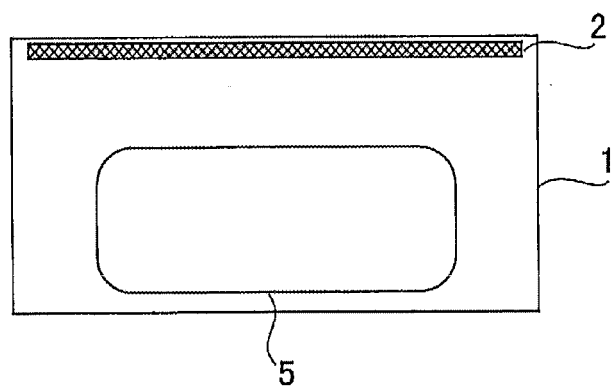

A scraper having the structure illustrated in FIG. 3(*a*) (in which the percentage of the opening was 21%) and a scraper having the structure illustrated in FIG. 3(*b*) (in which the percentage of the opening was 36%) were used as scrapers according to aspects of the present invention. In addition, regarding the scrapers according to aspects of the present invention, the inclination angle θ of the scraper illustrated in FIG. 3(*a*) was set to 17 degrees, and the inclination angle θ of the scraper illustrated in FIG. 3(*b*) was set to 25 degrees. Note that the load that is applied to the hearth roller B is 28 N, and the contact pressure is 2.8 kPa.

Figure 6:
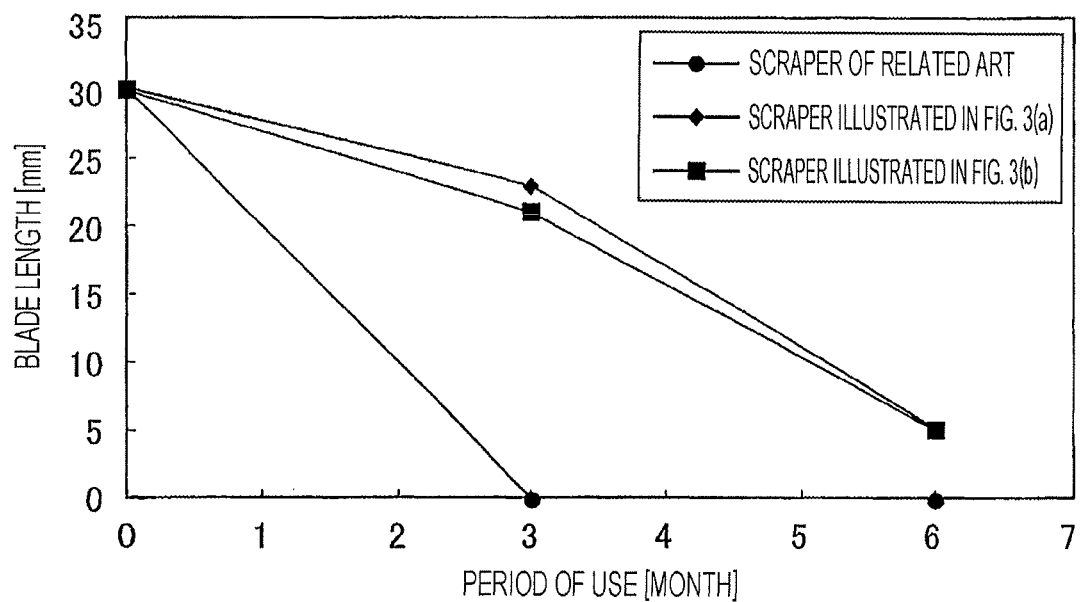
FIG. 6 is a graph illustrating the relationship between a period of use of the scraper and a blade length.

FIG. 6 is a graph illustrating the relationship between the period of use of the scraper A and the blade length. In the cases of the scrapers according to aspects of the present invention, even when the scrapers have been used for 3 months, the blade length was about 25 mm, and the amount of wear of the scraping claw 2 was small. In contrast, in the case of the scraper of the related art, the blade length became 0 mm when the scraper has been used for 3 months. Thus, in each of the scrapers according to aspects of the present invention, the amount of wear of the scraping claw 2 is smaller than that in the scraper of the related art, and it can be said that each of the scrapers according to aspects of the present invention has a longer service life than the scraper of the related art.

Next, the occurrence state of pressing flaws in a steel strip in case where the in-furnace hearth rollers in the siliconizing section 7 and the subsequent sections were each provided with the scraper according to aspects of the present invention, the occurrence state of pressing flaws in a steel strip in case where the in-furnace hearth rollers in the siliconizing section 7 and the subsequent sections were each provided with the scraper described in Patent Literature 1 (a scraper of the related art), and the occurrence state of pressing flaws in a steel strip in case where the in-furnace hearth rollers in the siliconizing section 7 and the subsequent sections were not provided with a scraper were examined. Note that a scraper having the structure illustrated in FIG. 3(*a*) (in which the percentage of the opening was 21% and in which the inclination angle θ was 17 degrees) was used as a scraper according to aspects of the present invention. (The load that is applied to the hearth roller B is 28 N, and the contact pressure is 2.8 kPa.)

Regarding pressing flaws, in a rolling direction of a steel sheet coil, a 10a-m-long region (the area determined by multiplying 10 m and the sheet width) of each of a leading end portion, an intermediate portion, and a trailing end portion of the steel sheet coil was visually inspected to count the number of pressing flaws, and the number of pressing flaws per unit area was calculated. Then, the calculated values in the leading end portion, the intermediate portion, and the trailing end portion were averaged and evaluated.

Figure 7:
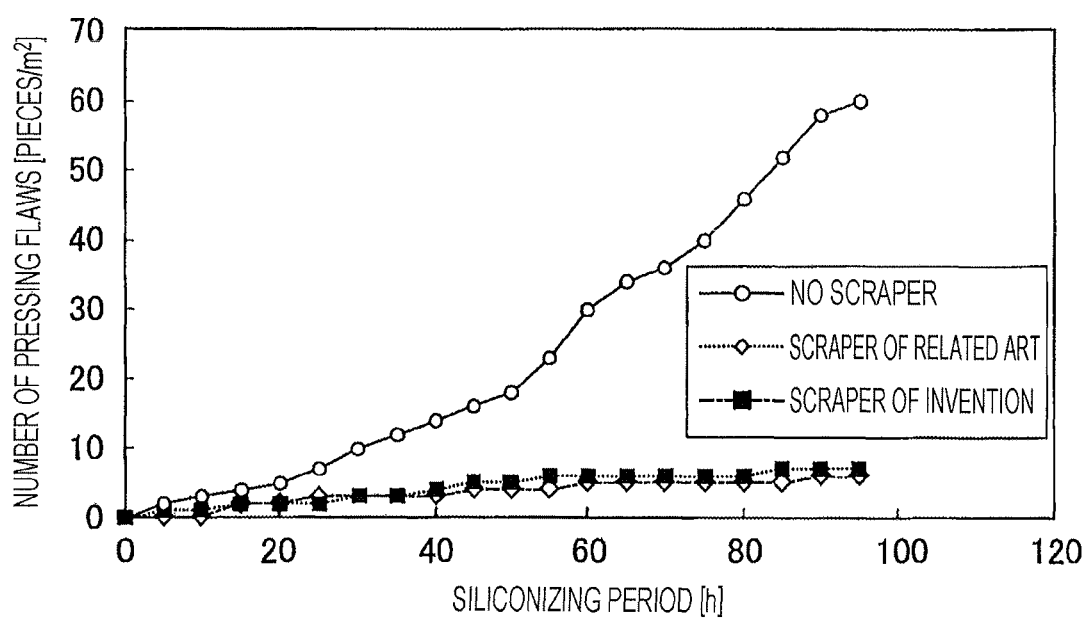
FIG. 7 is a graph illustrating the relationship between siliconizing period and the number of pressing flaws that are generated.

FIG. 7 is a graph illustrating the relationship between siliconizing period (h) and the number of pressing flaws that are generated (pieces/$m^2$). It can be said that the scraper according to aspects of the present invention, in which the scraper main body 1 is reduced in weight, has an effect of scraping off attached substances on a hearth roller, the effect being equivalent to that of a scraper of the related art. Therefore, it can be said that reduction of the weight of a scraper is extremely effective means for extending the service life of the scraper.

REFERENCE SIGNS LIST

1 scraper main body
2 scraping claw
3 floor portion
4 groove
5 opening
6 heating section
7 siliconizing section
8 diffusion soaking section
9 cooling section
A scraper
B hearth roller
S steel strip (steel sheet)

The invention claimed is:
1. A roller scraper that leans against a hearth roller in a continuous heat-treatment furnace to remove attached substances on a surface of the roller, the roller scraper comprising:
a scraper main body that is supported on a floor portion; and
a scraping claw that is disposed in such a manner as to project in a width direction of the scraper main body,
wherein the roller scraper leans against the roller in such a manner that the scraping claw is in contact with the surface of the roller,
wherein an opening is formed in the scraper main body, and
wherein the opening is provided such that a percentage of the opening in the scraper main body is from 19% to 40%.
2. A roller scraper according to claim 1,
wherein an angle θ of the scraper main body with respect to a vertical direction is 15 degrees to 40 degrees.

* * * * *